United States Patent
Dumbovic et al.

(10) Patent No.: US 6,223,595 B1
(45) Date of Patent: May 1, 2001

(54) RESISTIVE FLUID LEVEL SENSING AND CONTROL SYSTEM

(75) Inventors: Steve Dumbovic, Elmhurst; Richard C. Francke, Bartlett Lakes Estate, both of IL (US)

(73) Assignee: Illinois Tool Works Inc, Glenview, IL (US)

( * ) Notice: Subject to any disclaimer, the term of this patent is extended or adjusted under 35 U.S.C. 154(b) by 0 days.

(21) Appl. No.: 09/090,439

(22) Filed: Jun. 4, 1998

(51) Int. Cl.⁷ .............................. G01L 23/00; G08B 21/00
(52) U.S. Cl. ......................... 73/295; 73/304 R; 340/612
(58) Field of Search .................................. 73/295, 304 R; 340/612

(56) References Cited

U.S. PATENT DOCUMENTS

| | | |
|---|---|---|
| 3,667,296 | 6/1972 | Schiefer et al. . |
| 4,169,377 | 10/1979 | Scheib . |
| 4,912,407 * | 3/1990 | Gualtieri et al. ................... 73/290 R |
| 5,083,460 | 1/1992 | Kumada et al. . |
| 5,197,329 * | 3/1993 | Grundy ................................. 73/295 |
| 5,226,313 | 7/1993 | Murata et al. . |
| 5,501,102 | 3/1996 | Williamson . |
| 5,603,238 | 2/1997 | Williamson . |
| 5,626,053 | 5/1997 | Williamson . |
| 5,908,985 * | 6/1999 | Maatuk ................................. 73/295 |

* cited by examiner

Primary Examiner—Hezron Williams
Assistant Examiner—Katina Wilson
(74) Attorney, Agent, or Firm—Donald J. Breh; Mark W. Croll; John P. O'Brien

(57) ABSTRACT

An electrically resistive fluid level sensor and system for sensing fluid levels in a container, for example washing machine basins, and for closing a supply of fluid to the container when the fluid level in the container reaches a specified level. The system includes generally fluid level resistive element portions disposed in the container and electrically connectable by fluid therein, and an input signal source, electrically coupled to the fluid level resistive element portions, whereby an output signal across the fluid level resistive element portions is proportional to the fluid level. Temperature resistive element portions are preferably disposed in the container and connected in series between the input signal source and the fluid level resistive element portions to substantially cancel any thermal effects on fluid level sensing and control. The fluid level resistive element portions are electrically coupled to a signal input of a comparator circuit, whereby an output signal of the comparator circuit closes the supply fluid to the container when the fluid therein reaches a specified level.

25 Claims, 2 Drawing Sheets

RESISTIVE FLUID LEVEL SENSING AND CONTROL SYSTEM

BACKGROUND OF THE INVENTION

The invention relates generally to non-floating fluid level sensors, and more particularly to electrical systems for sensing and controlling fluid supplied to containers, for example washing machine basins.

Electrically resistive fluid level sensors are known generally for measuring conductive and partially conductive fluid levels, and provide many advantages over floating mechanical sensors, including the substantial elimination of corrosion susceptible parts, reduced cost, and improved accuracy and reliability.

Known electrically resistive fluid level sensors include generally a pair of isolated resistive elements disposed vertically in a container so that the resistance thereof varies in some proportion to the fluid level therein. The resistive elements are usually carbon or polymeric base materials, whereby the conductive or partially conductive fluid in the container provides a relatively low resistance, or short circuit, path between the resistive elements thereby varying the effective electrical length, and thus varying the electrical resistance thereof, depending on the fluid level.

U.S. Pat. No. 5,083,460, issued Jan. 28, 1992, for example, discloses a pair of level detection resistors and one or more temperature compensating resistors disposed vertically in a tank as discussed generally above. One of the level detection or temperature compensating resistors is electrically coupled to a negative input of an amplifier circuit, and the other of the level detection or temperature compensating resistors is electrically coupled in a negative feedback loop of the amplifier between the output and the negative input. An alternating input signal generator is applied to one of the level detection resistors or the temperature compensating resistors, and generates a continuously variable amplified output signal proportional to the fluid level in the tank. The slope of the output signal increases or decreases depending upon whether the level sensing resistors are connected in the feedback loop of the amplifier or to the negative input thereof, and thermal effects on the slope of the output signal are cancelled. The amplifier and alternating input signal generator however substantially increase the overall cost of the level sensor.

The present invention is drawn toward advancements in the art of fluid level sensors, and more particularly to resistive fluid level sensors and systems.

It is an object of the present invention to provide novel resistive fluid level sensors and systems that are economical, and that overcome problems in the art.

It is also an object of the present invention to provide novel electrically resistive fluid level sensors and systems useable for sensing the level of conductive and partially conductive fluids in a container, for example washing machine basins, and for closing a supply of fluid thereto when the fluid level therein reaches a specified level.

It is another object of the present invention to provide novel electrically resistive fluid level sensors and systems that accurately sense and control fluid levels in containers, and that are not susceptible to environmental thermal variations.

It is a more particular object of the invention to provide novel electrically resistive fluid level sensors and systems comprising generally first and second elongated fluid level resistive element portions disposed substantially vertically in the container and electrically connectable by fluid in the container, and an input signal source, which is preferably a DC voltage source, electrically coupled to a first end portion of the first elongated fluid level resistive element portion, whereby an output signal across the first and second elongated fluid level resistive element portions is proportional to a fluid level in the container.

It is another more particular object of the invention to provide novel electrically resistive fluid level sensors and systems further comprising electrically insulated first and second elongated temperature resistive element portions disposed substantially vertically in the container and connected in series between the input signal source and the first and second elongated fluid level resistive element portions to substantially cancel any thermal effects on fluid level sensing and control.

It is another more particular object of the invention to provide novel electrically resistive fluid level sensors and systems further comprising the first and second elongated fluid level resistive element portions electrically coupled to a signal input of a comparator circuit, and a reference signal applied to a reference input of the comparator circuit, whereby an output signal of the comparator circuit closes the supply fluid to the container when the fluid therein reaches a specified level, which is selectable by adjusting the reference signal input to the comparator circuit.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTION

Figure 1:
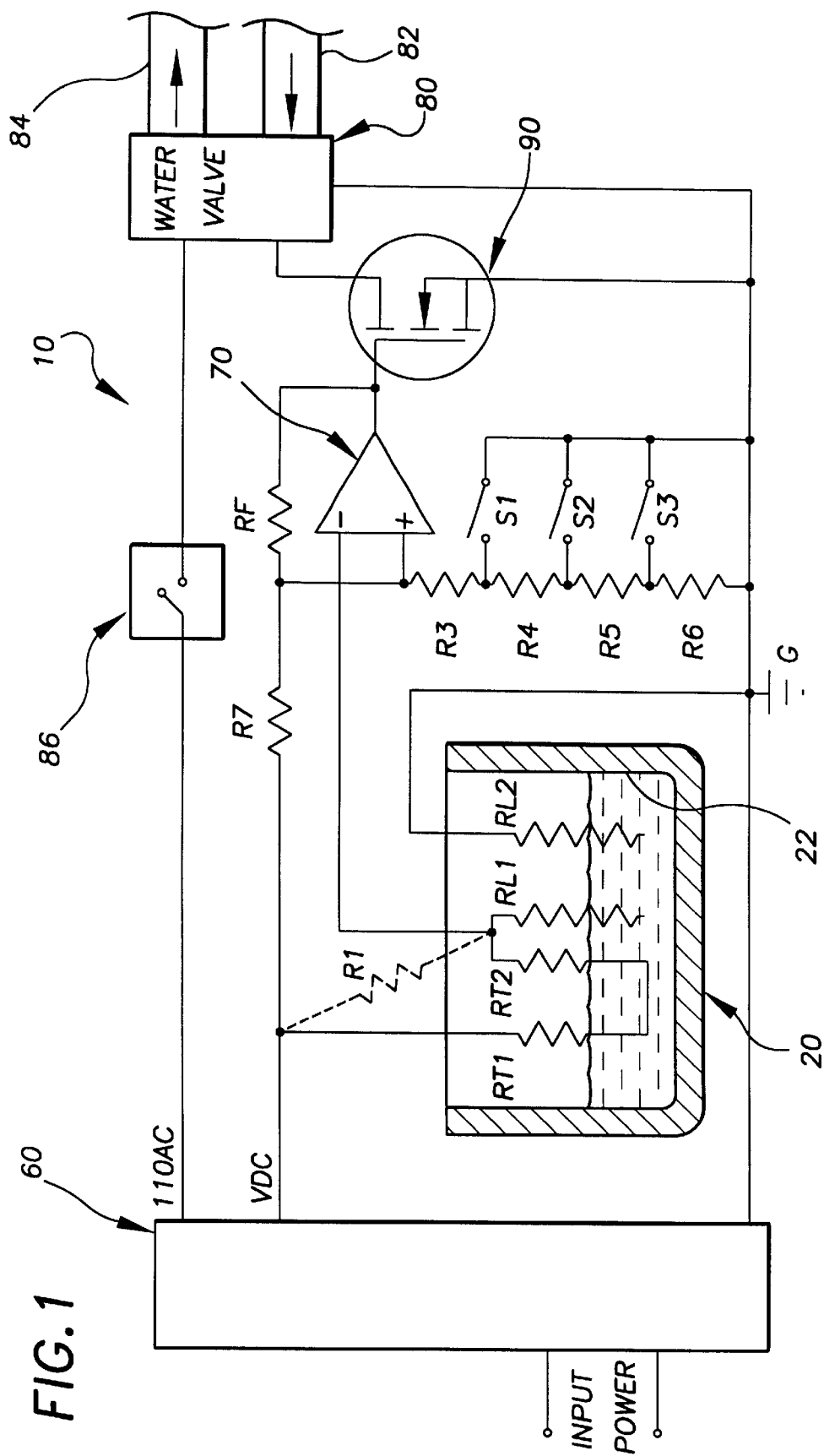
FIG. 1 is a fluid level sensor and control system according to an exemplary embodiment of the present invention.

FIG. 1 is a fluid level sensing system 10 useable for sensing the level of conductive or at least partially conductive fluids in a container 20, and also for controlling generally the supply of fluid thereto. According to an exemplary application of the invention, the container 20 is a washing machine basin, and the system 10 senses water level therein, and discontinues a supply of water thereto upon sensing a specified water level in the container, as discussed further below.

The system 10 comprises generally a first elongated fluid level resistive element portion RL1 disposed substantially vertically in the container 20 and a second elongated fluid level resistive element portion RL2 also disposed substantially vertically in the container. The first and second elongated fluid level resistive element portions RL1 and RL2 are arranged generally in electrically isolated, side by side relation, preferably substantially parallel, within the fluid container 20.

Figure 2:
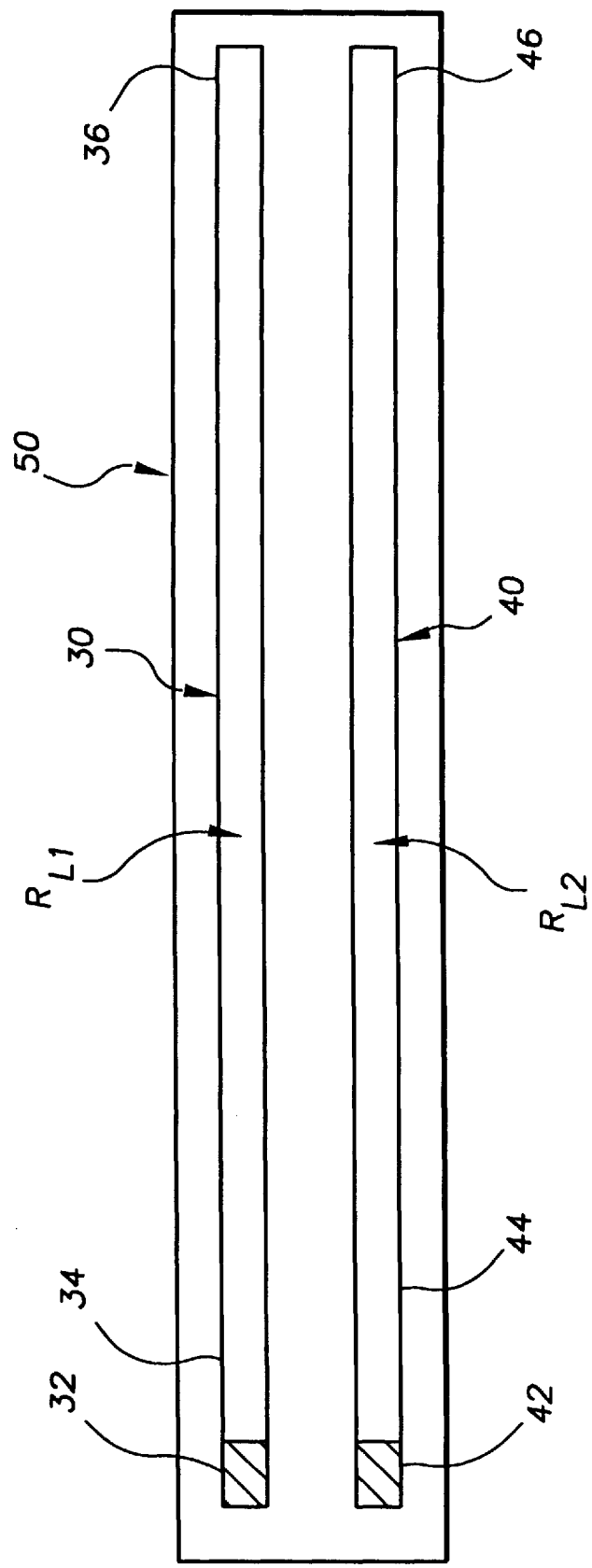
FIG. 2 is an exemplary elongate resistive material configuration useable with the fluid level sensor and control system of the present invention.

FIG. 2 illustrates the first and second elongated fluid level resistive element portions RL1 and RL2 formed preferably as separate conductive or partially conductive strips 30 and 40, respectively. The strips 30 and 40 each include corresponding upper end portions 34 and 44 and corresponding opposing lower end portions 36 and 46. The first and second elongated fluid level resistive element portions RL1 and RL2 may be formed alternatively as a single generally U-shaped strip having substantially parallel strip portions.

The strips 30 and 40 are preferably disposed in generally parallel spaced relation in the interior of the fluid container 20, whereby the upper end portions 34 and 44 are disposed generally at an upper level of the container and the lower end portions 36 and 46 are disposed at lower depths thereof. In embodiments where the first and second elongated fluid level resistive element portions RL1 and RL2 are formed of a single generally U-shaped, continuous strip having substantially parallel strip portions, the U-shaped portion thereof is disposed at the lower depth of the fluid container 20. The upper end portions 34 and 44 and the lower end portions 36 and 46 are also preferably mounted at the same upper and lower fluid levels in the fluid container 20. The level or depth of the first and second elongated fluid level resistive element portions RL1 and RL2 corresponds generally to the fluid levels to be sensed or measured, since fluid must form contact therewith for sensing.

FIG. 2 illustrates the strips 30 and 40 mounted on an insulating substrate member 50, which is conveniently disposed or mounted substantially vertically in the interior of the container 20, for example on an interior surface 22 thereof shown in FIG. 1. The substrate 50 may be a polyester material or other electrically insulating, fluid resistant material, which is generally tolerant of environmental conditions occurring within the container 20. The strips 30 and 40 may be mounted alternatively directly to the interior surface 22 of the fluid container 20 so long as the strips are electrically insulated from any conductive surface thereof. The substrate 50 however eases installation and ensures that the strips 30 and 40 are aligned properly and mounted at the same levels, and provides an electrically insulated mounting surface.

The strips 30 and 40 are preferably formed of the same material and have substantially the same electrical resistivity per unit length, whereby the resistance of the strips varies substantially linearly along the length thereof. The conductive or partially conductive strips 30 and 40 may be formed, for example, of carbon or polymer or polyester base materials, or other known resistive materials suitable for fluid level sensing applications. In one exemplary application, the strips 30 and 40 have an electrical resistance of approximately 100,000 ohms along the entire length between the upper and lower ends thereof. The resistive value of the strips 30 and 40 may be more or less depending on the particular application, and the exemplary resistive value is not intended to limit the invention.

The first and second strips 30 and 40 also have preferably substantially the same length and width dimensions. In one exemplary embodiment, the strips 30 and 40 are approximately 18 inches in length and ½ inch in width, and may include an adhesive backing for adherence to the substrate 50 or directly to the interior surface of the container. In other applications, the length and width of the strips 30 and 40 may be more or less, depending primarily on the range of fluid level depths to be measured, wherein the exemplary dimensions are not intended to limit the invention.

In one embodiment, the strips 30 and 40 include corresponding conductive electrodes 32 and 42 located at the upper end portions 34 and 44 thereof. The conductive electrodes 32 and 42 are formed of a tin or silver paste, or some other relatively conductive material and are electrically coupled to the upper end portions 34 and 44 of the corresponding strips 30 and 40. The conductive electrodes 32 and 42 facilitate electrically connecting the strips 30 and 40 to electrical leads or wires, which may be coupled to an electrical circuit discussed further below. The conductive electrodes 32 and 42 also provide relatively low resistance contact points, whereby the fluid in the container 20 forms a low resistance path therebetween, which may be useful in some control applications. In applications where the strips 30 and 40 are fastened to the substrate 50, so too are the corresponding conductive electrodes 32 and 42, which alternatively may be fastened directly to the interior surface of the fluid container in applications where the strips are also fastened directly thereto.

FIG. 1 illustrates generally an input signal source 60 electrically coupled to a first end portion of the first elongated fluid level resistive element portion RL1, and a first resistor R1, shown in phantom, electrically coupled in series between the input signal source 60 and the first end portion of the first elongated fluid level resistive element portion RL1. The input signal source 60 is preferably a DC voltage source that applies a DC voltage V, measured relative to some common reference, for example a circuit board ground G, to the first end portion of the first elongated fluid level resistive element portion RL1. The input signal source 60 may be provided by a voltage converter including a transformer for stepping down an AC input power supply voltage, a diode bridge coupled to the stepped-down voltage side of the transformer to generate a DC voltage, and a filter and regulator to provide the DC voltage V applied to the fluid level resistive element portions RL1 and RL2.

The first and second elongated fluid level resistive element portions RL1 and RL2 are electrically connectable by fluid in the container, which completes an electrical circuit, whereby an output signal across the first and second elongated fluid level resistive element portions RL1 and RL2 is proportional to a fluid level in the container. More particularly, when a conductive or partially conductive fluid in the container 20 contacts the first and second elongated fluid level resistive element portions RL1 and RL2, the fluid provides a low resistance conduction path between all portions thereof below the fluid level thereby forming an electrical connection therebetween. The fluid level in the tank thereby decreases the effective resistance measurable along the portions of the first and second elongated fluid level resistive element portions RL1 and RL2 above the fluid level, which is proportional to the fluid level in the container 20.

Thus as fluid level in the container 20 rises and contacts the first and second elongated fluid level resistive element portions RL1 and RL2, the fluid completes, or closes, the electrical circuit providing a detectable output signal across the first and second elongated fluid level resistive element portions RL1 and RL2. As the fluid level in the container 20 continues to rise, some parameter of the output signal also changes in proportion to the changing fluid level. In the exemplary embodiment, the voltage amplitude across the first and second elongated fluid level resistive element portions RL1 and RL2 changes with changing fluid level.

In the exemplary embodiment, the lower end portions 36 and 46 of the first and second elongated fluid level resistive element portions RL1 and RL2 are electrically isolated, as illustrated in FIG. 2. When the fluid level in the container 20 is below the lower end portions 36 and 46 of the first and second elongated fluid level resistive element portions RL1 and RL2, the resistance is substantially infinite creating an open circuit condition where no DC current flows. Thus, the DC voltage detectable across the first and second elongated fluid level resistive element portions RL1 and RL2 is the same as the DC voltage supply V.

Also in the exemplary embodiment, the first and second elongated fluid level resistive element portions RL1 and RL2 include the relatively conductive electrodes 32 and 42 located at the upper end portions 34 and 44 thereof, as shown in FIG. 2 and discussed above. When the fluid level in the container 20 rises to the level of the conductive electrodes 32 and 42, the resistance across the first and second elongated fluid level resistive element portions RL1 and RL2 will be substantially zero, except for the inherent resistance of the fluid and contact resistance with the conductive electrodes, which is usually relatively small. Thus, the DC voltage across the first and second elongated fluid level resistive element portions RL1 and RL2 is relatively low, which may be used to prevent over-filling the container 20.

The first resistor R1 preferably comprises first and second elongated temperature resistive element portions RT1 and RT2 disposed substantially vertically in the container 20, as illustrated in FIG. 1. According to this preferred configuration, the input signal source 60, which is a DC voltage signal source V, is electrically coupled to a first end portion of the first elongated temperature resistive element portion RT1. A second end of the first elongated temperature resistive element portion RT1 is electrically coupled to a first end portion of the second elongated temperature resistive element portion RT2, and a second end portion of the second elongated temperature resistive element portion RT2 is electrically coupled to the first end portion of the first elongated fluid level resistive element portion RL1.

The first and second elongated temperature resistive element portions RT1 and RT2 have the effect of cancelling or offsetting any variations in the output signal measured across the first and second elongated fluid level resistive element portions RL1 and RL2 resulting from variations in temperature. The temperature of the first and second elongated temperature and fluid level resistive element portions is affected generally by environmental temperature variations, including ambient air temperature and most significantly by fluid temperature variations.

The first and second elongated temperature resistive element portions RT1 and RT2 are configured similarly to the first and second elongated fluid level resistive element portions RL1 and RL2, and may be adhered to the interior surface 22 of the container either directly or by a substrate, as discussed above and illustrated in FIG. 2. The first and second elongated temperature resistive element portions RT1 and RT2 are insulated from the fluid, and thus not relatively short circuited thereby.

The first and second elongated temperature resistive element portions RT1 and RT2 are formed of the same material and have substantially the same resistivity per unit length as each other and as the first and second elongated fluid level resistive element portions RL1 and RL2. The first and second elongated temperature resistive element portions RT1 and RT2 also have the same overall electrical resistance between the upper and lower ends thereof as each other and as the first and second elongated fluid level resistive element portions RL1 and RL2, which is 100,000 ohms in the exemplary embodiment. The first and second elongated temperature resistive element portions RT1 and RT2 also preferably have the same length and width dimensions as the first and second elongated fluid level resistive element portions RL1 and RL2. Additionally, upper and lower end portions of the first and second elongated temperature resistive element portions RT1 and RT2 are preferably disposed in the container 20 at the same levels as the upper and lower end portions of the first and second elongated fluid level resistive element portions, respectively, as illustrated generally in FIG. 1. Thus configured, the first and second elongated temperature resistive element portions RT1 and RT2 will be affected similarly by temperature as the first and second elongated fluid level element portions RL1 and RL2, thereby cancelling temperature induced variations in the output signal.

The system 10 further comprises generally the first end portion of the first elongated fluid level resistive element portion RL1 electrically coupled to a signal input of a comparator circuit 70. A reference signal is applied to a reference input of the comparator circuit 70, whereby an output signal of the comparator circuit 70 changes between first and second voltage levels, or states, depending on whether the output signal across the first and second elongated fluid level resistive element portions RL1 and RL2 applied to the signal input of the comparator circuit 70 is greater or less than the reference signal applied to the reference input of the comparator circuit 70.

In the exemplary embodiment of FIG. 1, the first end portion of the first elongated fluid level resistive element portion RL1 is electrically applied to the negative (−) input of the comparator circuit 70, and the reference signal is a reference voltage signal applied to the positive (+) input thereof. The voltage reference signal is formed by applying the DC voltage V to a resistive divider network including R7 and one or more of resistors R3, R4, R5 and R6, selectively coupled to the positive input of the comparator circuit 70, as discussed further below. Thus configured, the comparator circuit output is low when the voltage at the negative input exceeds the voltage at the positive input thereof, and the comparator circuit output is high when the voltage at the positive input exceeds the voltage at the negative input thereof. FIG. 1 also illustrates the comparator circuit 70 preferably comprising a feedback resistor RF electrically coupled between the output of the comparator circuit 70 and the negative input thereof, whereby the feedback resistor RF tends to stabilize the output signal of the comparator circuit 70.

In one embodiment, a variable-position switch electrically couples a variable resistance to the positive input of the comparator circuit 70 to vary the reference signal applied thereto depending on the position or configuration of the variable-position switch. The variable-position switch is thus adjustable to select at which fluid level in the container the comparator circuit 70 changes state from low to high, or from high to low, whereby the output signal of the comparator circuit 70 is useable for controlling, and in the exemplary embodiment shutting off the supply of fluid to the container 20 at a particular fluid level.

The variable-position switch in the exemplary embodiment is a discretely variable switch having multiple contacts indicated by S1, S2 and S3, as illustrated in FIG. 1. When contacts S1 are electrically connected, or closed, the reference signal applied to the comparator circuit 70 is proportional to R3. When contacts S2 are closed and contacts S1 opened, the reference signal applied to the comparator circuit 70 is proportional to R3 and R4 in series. When contacts S3 are closed and contacts S1 and S2 opened, the reference signal applied to the comparator circuit 70 is proportional to R3, R4 and R5 in series. And when contacts S1, S2 and S3 are all opened, the reference signal applied to the comparator circuit 70 is proportional to R3, R4, R5, and R6 in series. Thus any one of four discrete reference voltage signals may be applied to the comparator circuit 70 by selectively varying, or adjusting, the variable-position switch. Other discrete switch configurations may generate more or less reference voltage signals applied to the comparator circuit 70. Alternatively, the variable-position switch may be a continuously variable switch.

The resistive values of the resistors R7 and R3–R5 forming the resistive divider network that generates the reference signals applied to the reference input of the comparator circuit 70 and the first and second elongated fluid level resistive element portions RL1 and RL2 are selected so that the comparator circuit 70 generates output signals, or changes state, at corresponding desired fluid levels in the fluid container 20. More particularly, the resistive values of the first and second elongated fluid level resistive element portions RL1 and RL2 must be chosen so that the range of output voltage values applied to the signal input of the comparator circuit 70 generally overlaps the range of reference voltage values applied to the reference input of the comparator circuit 70 by the variable-position switch, whereby the changing output of the comparator circuit 70 is useable for shutting off the supply of fluid to the container 20, depending on the reference voltage applied to the reference input of the comparator circuit 70. Thus configured, the variable-position switch is a user operable water level selection switch, which may be mounted on a control panel of the washing machine in the exemplary application.

FIG. 1 illustrates the system 10 further comprising an electrically actuatable valve system 80 that controls a supply of fluid to the container 20, for example a solenoid actuatable fluid valve system. The valve system 80 includes generally a fluid inlet coupled to a fluid source conduit 82, and a fluid outlet coupled to a fluid supply conduit 84 that supplies fluid to the container 20. In the exemplary application, the valve system 80 is actuatable from a switch 86 on the control panel of the washing machine to turn on, or open, and to turn off, or close, the supply of water to the supply conduit 84, thus controlling the water supply to the basin.

The output of the comparator circuit 70 is electrically coupled generally to a controlling input of the electrically actuatable valve system 80, whereby the valve system 80 is actuatable to turn off, or close, the supply of fluid to the container 20 depending on the state of the comparator circuit output. In the exemplary embodiment, the output of the comparator circuit 70 turns on and off a solid state switch 90, for example a FET, depending on the values of the negative and positive input signals to the comparator circuit 70. In the exemplary embodiment, a high output on the comparator circuit 70 turns on the switch 90, which actuates valve system 80 to stop the supply of fluid to the container 20, whereas the switch 90 is off when the output on the comparator circuit 70 is low. The switch 90 may, for example, control another switch, not shown, that interrupts power supplied to the valve system.

As discussed generally above, when there is no fluid in the container 20, the voltage applied to the negative input of the comparator circuit 70 is approximately the same as the DC supply voltage V, and is greater than the reference voltage applied to the positive input, thereby driving the comparator circuit 70 output low so that the switch 90 is off. Fluid or water may thus be supplied to the container 20, usually by closing a switch 86, which is also disposed generally on the control panel of the washing machine in the exemplary application. As the fluid level in container 20 rises, the voltage applied to the negative input of the comparator circuit 70 decreases correspondingly. When the voltage applied to the negative input of the comparator circuit 70 drops below the voltage applied to the positive input thereof due to the rising fluid level in the container 20, the output of the comparator circuit 70 is driven high and the switch 90 is turned on, which interrupts power to the fluid valve system 80, thereby closing the supply of fluid to the container 20.

If fluid in the container 20 rises to the level of the conductive electrodes 32 and 42 located at the upper end portions 34 and 44 of the first and second elongated fluid level resistive element portions RL1 and RL2, the resistance across the first and second elongated fluid level resistive element portions RL1 and RL2 and the DC voltage applied to the negative input of the comparator circuit 70 will be substantially zero, or at least much lower than the reference voltage applied to the positive input of the voltage comparator 70, thereby driving the output of the comparator circuit high, which will turn on switch 90, thereby disabling the supply of fluid to prevent over-filling of the container 20 in a fail-safe mode of operation.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A fluid level sensing system useable for sensing the level of conductive and partially conductive fluids in a container, the system comprising:

a first elongated fluid level resistive element portion disposed substantially vertically in the container;

a second elongated fluid level resistive element portion disposed substantially vertically in the container;

a first elongated temperature resistive element portion disposed substantially vertically in the container;

a second elongated temperature resistive element portion disposed substantially vertically in the container, a second end portion of the second elongated temperature resistive element portion electrically coupled to a first end portion of the first elongated fluid level resistive element portion;

an input signal source electrically coupled to a first end portion of the first elongated temperature resistive element portion;

the first and second elongated temperature resistive element portions and the first and second elongated fluid level resistive element portions electrically connectable by fluid in the container, whereby an output signal across the first and second elongated fluid level resistive element portions is proportional to a fluid level in the container, and the first and second elongated temperature resistive element portions offset variations in the output signal resulting from variations in temperature.

2. The system of claim 1 further comprising the input signal is a DC voltage source, and the output signal is a DC voltage signal.

3. The system of claim 1 further comprising the first end portion of the first elongated fluid level resistive element portion electrically coupled to a negative input of a comparator circuit, and a reference signal applied to a positive input of the comparator circuit, an output signal of the comparator circuit changeable between first and second states depending on whether the output signal across the first and second elongated fluid level resistive element portions is more or less than the first reference signal.

4. The system of claim 3 further comprising a variable-position switch electrically coupling a variable resistance to the positive input of the comparator circuit, the reference signal applied to the positive input of the comparator circuit variable depending on the variable resistance applied to the positive input of the comparator circuit, whereby the variable-position switch is adjustable to select at which fluid level in the container the comparator circuit changes state.

5. The system of claim 3 further comprising an electrically actuatable valve system controlling a supply of fluid to the container, the output of the comparator circuit electrically coupled to a controlling input of the electrically actuatable valve system, whereby the electrically actuatable valve system is actuatable to close the supply of fluid to the container when the fluid level in the container reaches a specified level.

6. The system of claim 5 further comprising the first end portion of the first elongated fluid level resistive element portion having a first relatively electrically conductive portion located near an upper portion of the container, and the second end portion of the second elongated fluid level resistive element portion having a second relatively electrically conductive portion located near the upper portion of the container, whereby fluid in the container contacting the first and second relatively electrically conductive portions of the first and second elongated fluid level resistive element portions causes the electrically actuatable valve system to close the supply of fluid to the container.

7. The system of claim 5 further comprising the fluid includes water, the container is a washing machine basin, the electrically actuatable valve system is a water supply valve system controlling the supply of water to the container, and the first and second elongated temperature resistive element portions are insulated from the water.

8. The system of claim 3 further comprising a feedback resistor electrically coupled between the output of the comparator circuit and the reference input of the comparator circuit, whereby the feedback resistor stabilizes the output signal of the comparator circuit.

9. The system of claim 1 further comprising the first and second elongated fluid level resistive element portions have substantially the same resistivity per unit length.

10. The system of claim 9 further comprising the first and second elongated fluid level resistive element portions each having a resistance of approximately 100,000 ohms over the length thereof.

11. The system of claim 1 further comprising the first and second elongated fluid level resistive element portions and the first and second elongated temperature resistive element portions have substantially the same length and width.

12. A fluid level sensing system useable for sensing the level of conductive and partially conductive fluids in a container, the system comprising:
a first elongated fluid level resistive element portion disposed substantially vertically in the container;
a second elongated fluid level resistive element portion disposed substantially vertically in the container,
the first and second elongated fluid level resistive element portions formed of an insulating substrate having a relatively conductive strip thereon;
an input signal source electrically coupled to a first end portion of the first elongated fluid level resistive element portion;
a first resistor electrically coupled in series between the input signal source and the first end portion of the first elongated resistive element portion;
the first and second elongated fluid level resistive element portions electrically connectable by fluid in the container,
whereby an output signal across the first and second elongated fluid level resistive element portions is proportional to a fluid level in the container.

13. The system of claim 12 further comprising the input signal is a DC voltage source, and the output signal is a DC voltage signal.

14. The system of claim 12 further comprising the first end portion of the first elongated fluid level resistive element portion electrically coupled to a signal input of a comparator circuit, and a reference signal applied to a reference input of the comparator circuit, an output signal of the comparator circuit changeable between first and second states depending on whether the output signal across the first and second elongated fluid level resistive element portions is more or less than the first reference signal.

15. The system of claim 14 further comprising a variable-position switch electrically coupling a variable resistance to the reference input of the comparator circuit, the reference signal applied to the reference input of the comparator circuit variable depending on the variable resistance applied to the reference input of the comparator circuit, whereby the variable-position switch is adjustable to select at which fluid level in the container the comparator circuit changes state.

16. The system of claim 14 further comprising an electrically actuatable valve system controlling a supply of fluid to the container, the output of the comparator circuit electrically coupled to a controlling input of the electrically actuatable valve system, whereby the electrically actuatable valve system is actuatable to close the supply of fluid to the container when the fluid level in the container reaches a specified level.

17. The system of claim 16 further comprising the fluid includes water, the container is a washing machine basin, and the electrically actuatable valve system is a water supply valve system controlling the supply of water to the container.

18. The system of claim 14 further comprising a feedback resistor electrically coupled between the output of the comparator circuit and the reference input of the comparator circuit, whereby the feedback resistor stabilizes the output signal of the comparator circuit.

19. The system of claim 12 further comprising the first and second fluid level elongated resistive element portions having substantially the same resistivity per unit length.

20. The system of claim 12 further comprising the first and second elongated fluid level resistive element portions having substantially the same length and width.

21. A fluid level sensing system useable for sensing the level of conductive and partially conductive fluids in a container, the system comprising:
a first elongated fluid level resistive element portion disposed substantially vertically in the container;
a second elongated fluid level resistive element portion disposed substantially vertically in the container;
an input signal source electrically coupled to a first end portion of the first elongated fluid level resistive element portion;
a first resistor electrically coupled in series between the input signal source and the first end portion of the first elongated resistive element portion;
the first and second elongated fluid level resistive element portions electrically connectable by fluid in the container, a comparator circuit, the first end portion of the first elongated fluid level resistive element portion electrically coupled to a signal input of the comparator circuit;

a reference signal applied to a reference input of the comparator circuit, an output signal of the comparator circuit changeable between first and second states depending on whether the output signal across the first and second elongated fluid level resistive element portions is more or less than the first reference signal, whereby an output signal across the first and second elongated fluid level resistive element portions is proportional to a fluid level in the container.

22. The system of claim 21 further comprising a variable-position switch electrically coupling a variable resistance to the reference input of the comparator circuit, the reference signal applied to the reference input of the comparator circuit variable depending on the variable resistance applied to the reference input of the comparator circuit.

23. The system of claim 21 further comprising an electrically actuatable valve system controlling a supply of fluid to the container, the output of the comparator circuit electrically coupled to a controlling input of the electrically actuatable valve system.

24. The system of claim 23 further comprising the fluid includes water, the container is a washing machine basin, the electrically actuatable valve system is a water supply valve system controlling the supply of water to the container.

25. The system of claim 21 farther comprising a feedback resistor electrically coupled between the output of the comparator circuit and the reference input of the comparator circuit.

* * * * *